UNITED STATES PATENT OFFICE.

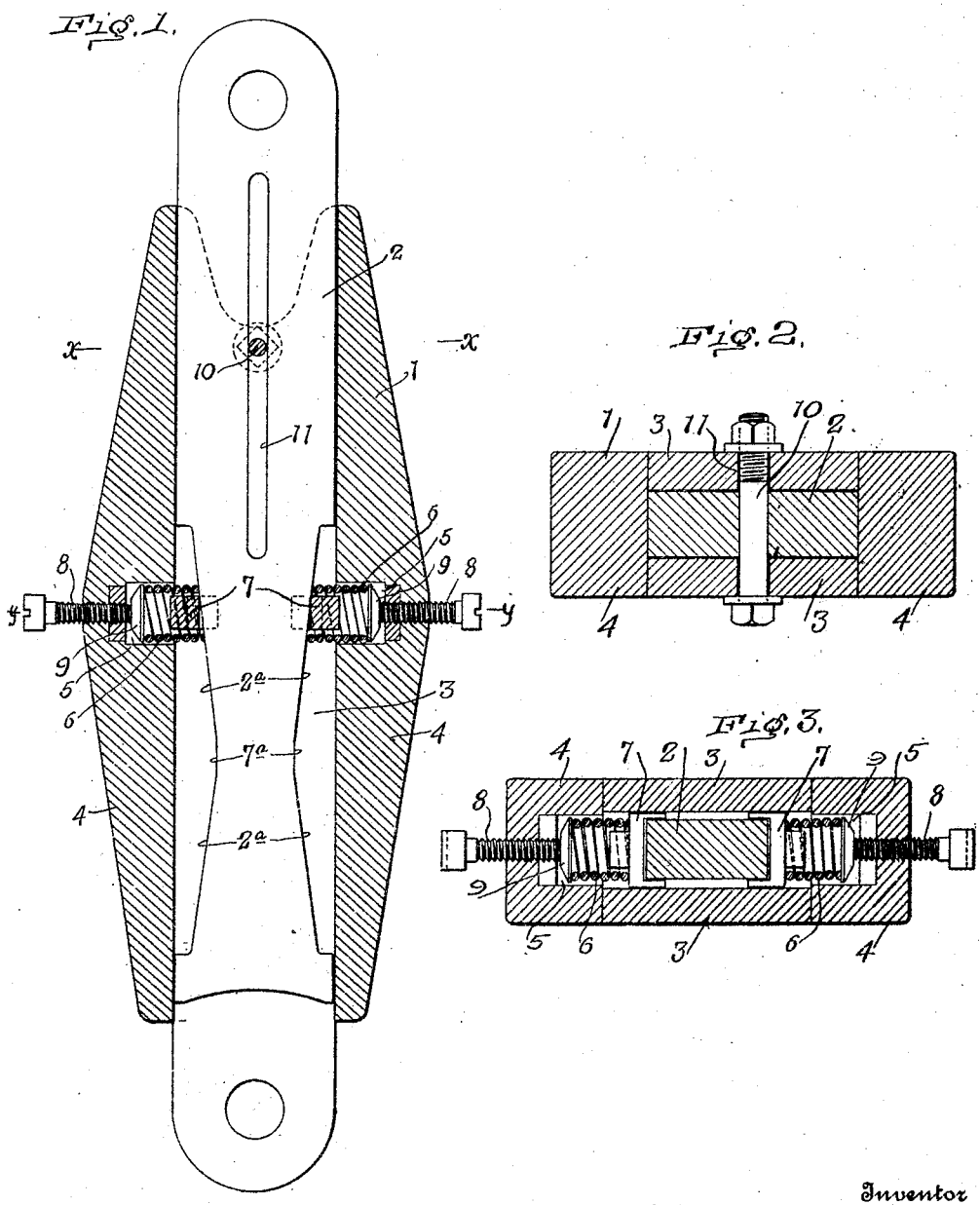

FRANK C. ADAMS, OF YELLOW SPRINGS, OHIO, ASSIGNOR OF ONE-FOURTH TO HARRY R. ESTEL AND ONE-FOURTH TO SOLOMON WILSON, BOTH OF YELLOW SPRINGS, OHIO.

SHOCK-ABSORBER.

1,153,531.

Specification of Letters Patent. Patented Sept. 14, 1915.

Application filed April 5, 1915. Serial No. 19,128.

*To all whom it may concern:*

Be it known that I, FRANK C. ADAMS, a citizen of the United States, residing at Yellow Springs, in the county of Greene and State of Ohio, have invented certain new and useful Improvements in Shock-Absorbers, of which the following is a specification, reference being had therein to the accompanying drawing.

This invention relates to shock absorbers for vehicles and, while it is designed more particularly for use in connection with automobiles, it is useful with vehicles or similar devices of various kinds.

The object of the invention is to provide a simple highly efficient shock absorber which will not interfere with the action of the springs under ordinary conditions but which will become operative only under abnormal conditions, as when the vehicle is traveling over a rough road.

To this end it is a further object of the invention to provide such a device comprising relatively movable parts adapted to be connected respectively with the body and axle of a vehicle and having coöperating parts to permit a limited relative movement of the body and axle but to resist the relative movement of these parts when it exceeds such limit.

It is also an object of the invention to provide such a device which will be very simple in its construction and of such a character that little strain will be imposed upon it when in operation and which, consequently, will be little liable to injury in its normal use.

In the accompanying drawings, Figure 1 is a sectional view taken longitudinally of a shock absorber embodying my invention; Fig. 2 is a transverse sectional view taken on the line *x x* of Fig. 1; and Fig. 3 is a transverse, sectional view taken on the line *y y* of Fig. 1.

In these drawings I have illustrated one embodiment of my invention and have shown the same as comprising a frame member or casing 1 having a longitudinal guideway in which is mounted a longitudinally movable member or slide 2, the slide being adapted for connection with the body of the vehicle and the casing being adapted for connection with the axle.

While I have shown the invention as embodied in a device comprising parts having longitudinal sliding movement it will be understood that while certain features of the invention are peculiar to such device other features may be embodied in a device in which the members have different relative movement or in which the members are connected with the body and the axle of the vehicle in different manners.

It will be noted that the casing or frame member 1 is made up of side plates 3 which are connected one to the other by edge pieces 4 which may be connected with the side pieces by means of screws or in any suitable manner. Preferably, these edge pieces are tapered from their central portions toward their ends so as to give an increased thickness and greater strength at the central portion. The side plates and edge pieces 3 and 4 are so arranged in the present instance as to form between them a rectangular opening which constitutes a guideway and in which is mounted movable member or slide 2, this member being of such a shape as to fit snugly within the guideway. Either the casing or the slide, and preferably the latter, is provided with oppositely inclined portions constituting cam surfaces. In the present embodiment of the invention the slide 2 has its opposite edge portions cut away in such a manner as to provide each edge thereof with two inclined portions 2ª which converge away from the adjacent edge member 4, so as to form a very obtuse V in each edge of the slide. The other of said members, in the present instance the frame member or casing, is provided with a yieldable device arranged to engage one of the inclined portions of the slide when the latter is moved in either direction and to exert pressure on the edge of the slide which will resist its movement. As here shown the thickened central portion of each of the edge pieces 4 of the frame member is provided with a recess 5 in which is mounted a spring 6, the outer end of which engages a shoe 7 bearing upon the adjacent edge of the slide 2. The springs are so arranged that the shoes will exert the least pressure upon the edges of the slide when the latter is in its intermediate or neutral position and as the slide moves away from this neutral position, in either direction, the increasing width thereof, caused by the inclination of its edges, will force the shoes outwardly against the tension of their springs and will thus cause the shoes to exert a pressure thereon which will resist the further movement of the slide in the direction in which it has started, thereby gradually bringing the slide to a stop.

In order that the springs of the vehicle may be free to act without interference I preferably provide each edge of the slide with a neutral space 7ª between its inclined portions which will be so arranged with relation to the yieldable members or shoes 7 that the latter will exert little or no pressure thereon, and, consequently, will offer little or no resistance to the movement of the slide when these neutral portions are adjacent to the yieldable devices. This feature is of very material importance because the springs of the ordinary automobile are adjusted to take care of their load under ordinary road conditions and if a shock absorber is of such a character that it resists the relative movement of the body and the axle under ordinary conditions it will then have the effect of stiffening the spring action and greatly reducing their efficiency. Such an absorber may cushion the movement of the body in such a manner as to make the vehicle very easy riding over a bad road, but, by reducing the efficiency of the springs, it makes the vehicle hard riding over a fairly good road. By providing my absorber with a neutral portion long enough to permit of all normal movements of the body I overcome this difficulty entirely and utilize the full efficiency of the springs under ordinary conditions and absorb only the abnormal shocks.

If desired means may be provided for adjusting the tension of the spring 6 and thereby regulating the resistance offered to the movement of the slide 2. This I accomplish in the present instance by mounting a screw 8 in the outer portion of each of the edge pieces 4 and causing its inner end to project into the corresponding recess 5 and to engage a disk 9 which bears upon the outer end of the spring. By adjusting the screw the tension of the spring can be regulated.

In addition to the resistance offered to the movement of the slide by the yieldable members 7 I can secure a further resistance by drawing the side plates 3 against the adjacent surfaces of the slide and thus causing a frictional contact which will resist any movement of the slide. This frictional contact, however, may be adjusted so that it will not interfere with the spring action to a greater extent than is desired. As here shown, a bolt 10 is extended through the two side plates 3 and through an elongated slot 11 in the slide 2 and serves to draw the side plates 3 against the slide but to permit the latter to move relatively thereto.

The operation of the device will be readily understood from the foregoing description and it will be apparent that I have provided a shock absorber which is of a very simple character and of such a strong, durable construction that there is little liability of its being broken or injured in ordinary use; and further, which is of such a character that it can be easily adjusted to cause it to offer more or less resistance to the relative movement of the body and axle. It will also be apparent that I have so constructed the device as to prevent any interference with the normal operation of the springs under ordinary conditions.

While I have shown and described one embodiment of my invention it will be understood that this has been chosen for the purposes of illustration and that I do not desire to be limited to the details of construction shown and described, for obvious modifications will occur to a person skilled in the art.

Having thus fully described my invention, what I claim as new and desire to secure by Letters Patent, is:—

1. In a shock absorber, an elongated casing having a guideway extending lengthwise thereof, and having in one end means for attaching it to a part of a vehicle, a bar slidably mounted in said guideway, having a cam surface, and having at one end means for attaching it to another part of said vehicle, the attaching means for said casing and said bar being at opposite ends of said casing, and a yieldable part carried by said casing to engage the cam surface of said slidable bar.

2. In a shock absorber, an elongated casing having a guideway extending lengthwise thereof, and having at one end means for attaching it to a part of a vehicle, a bar slidably mounted in said guideway, having cam surfaces on both edges thereof, and having at one end means for attaching it to another part of said vehicle, the attaching means for said casing and for said bar being at opposite ends of said casing, said casing having recesses adjacent to the edges of said bar, springs mounted in the respective recesses and parts interposed between said springs and the respective cam surfaces of said bar, and adapted to yieldably engage said cam surfaces.

3. In a shock absorber, an elongated casing having a guideway extending lengthwise thereof, and having at one end means for attaching it to a part of a vehicle, a bar slidably mounted in said guideway, having a cam surface, and having at one end means for attaching it to another part of said vehicle, the attaching means for said casing and said bar being at opposite ends of said casing, a yieldable part carried by said casing to engage the cam surface of said slidable bar, and means to clamp the side walls of said casing against said bar to frictionally resist its movement.

4. In a shock absorber, an elongated casing having means to attach it to a part of a vehicle and comprising side plates and edge pieces secured to said side plates, said parts being arranged to form a guideway, a bar slidably mounted in said guideway and having those edges adjacent to said edge pieces cut away to provide oppositely inclined portions, said edge pieces each having a recess, a shoe mounted on each edge of said slide bar and arranged to engage one of said inclined surfaces when said bar moves relatively to said casing, a spring mounted in each of said recesses and engaging the adjacent shoe to cause the latter to exert pressure on the inclined portion of said slide bar, which pressure will increase as the slide bar moves away from its normal position.

5. In a shock absorber, an elongated casing having means to attach it to a part of a vehicle and comprising side plates and edge pieces secured to said side plates, said parts being arranged to form a guideway, a bar slidably mounted in said guideway and having those edges adjacent to said edge pieces cut away to provide oppositely inclined portions, said edge pieces each having a recess, a shoe mounted on each edge of said slide bar and arranged to engage one of said inclined surfaces when said bar moves relatively to said casing, a spring mounted in each of said recesses and engaging the adjacent shoe to cause the latter to exert pressure on the inclined portion of said slide bar, which pressure will increase as the slide bar moves away from its normal position, a disk mounted in each of said recesses and bearing upon the end of said spring, and screws mounted in said edge pieces and extending into the respective recesses to engage said disk and regulate the tension of said springs.

6. In a shock absorber, an elongated casing having at one end means to attach it to a part of a vehicle, and comprising side plates and edge pieces secured to said side plates, said parts being arranged to form a guideway, a bar slidably mounted in said guideway and having those edges adjacent to said edge pieces cut away to provide oppositely inclined portions spaced apart to provide a neutral portion between them, each of said edge pieces having a recess, a shoe mounted on each edge of said slide bar, resting normally on the neutral portion thereof and arranged to engage one of the inclined portions of said bar when the latter moves relatively to said casing, a spring mounted in each of said recesses and engaging the adjacent shoe to cause the latter to exert pressure on the inclined portion of said slide bar, which pressure will inc ase as said bar moves away from its normal position.

7. In a shock absorber, a casing comprising side plates and edge pieces rigidly secured to said side plates, said parts being arranged to form a guideway, a bar slidably mounted in said guideway and having those edges adjacent to said edge pieces cut away to provide oppositely inclined portions, said edge pieces each having a recess, a shoe mounted on each of the edges of said slide bar, a spring mounted in each of said recesses and engaging the adjacent shoe to cause the latter to exert pressure on the inclined portion of said slide bar, which pressure will increase as said bar moves away from its normal position, said slide bar having a longitudinal slot, and a bolt extending through said side plates and said slot to draw the side plates into frictional engagement with said slide bar.

In testimony whereof, I affix my signature in presence of two witnesses.

FRANK C. ADAMS.

Witnesses:
C. E. ESTLE,
FLORECE KENNETT WHITE.